Oct. 29, 1940.  R. O. STOKES ET AL  2,219,639

HYDRAULIC CLASSIFIER

Filed Jan. 5, 1939  9 Sheets-Sheet 1

Fig. 1.

Inventors:
Rupert Octavius Stokes and
William Dickson Jenkyn Thomas;
By their attorneys,
Baldwin & Wight

Patented Oct. 29, 1940

2,219,639

UNITED STATES PATENT OFFICE 2,219,639

HYDRAULIC CLASSIFIER

Rupert Octavius Stokes, London Wall, London, and William Dixon Jenkyn Thomas, Norbury, London, England; said Thomas assignor to said Stokes Application January 5, 1939, Serial No. 249,504
In Great Britain January 8, 1938

10 Claims. (Cl. 209—496)

The invention relates to hydraulic classifiers of the hindered settling type, i. e. classifiers in which the solid material is placed in an upward current of some liquid, so that the particles above a certain size or weight accumulate in a sorting or separating chamber, while any smaller solids are carried up by the current and pass off with the overflow. The liquid usually enters through perforations in a plate forming the base of the separating chamber but these perforations cannot act as a discharge for the teetering solids on account of the high local velocity. It is therefore necessary to have some valve at the bottom of the chamber for discharging the particles continuously or intermittently.

An attempt has been made to secure an automatic continuous discharge so as to maintain a constant head of separated particles above the valve. For this purpose the water supply from a constant head tank to a chamber under the perforated base plate was balanced against the water made heavier by containing the separated particles. The clean water acted on a diaphragm to lift a plug valve in the bottom of the separating chamber.

Now, when a plug valve is closed a much greater lift is required to start it opening than to open it further, and moreover the higher such a valve is raised from its seat the less effort is required to lift it further. The increase or decrease of lifting effort over a given fall or rise of the plug is clearly much greater than the change with a corresponding variation in solid level of the differential force due to the columns of clean water and of water plus solid. In any intermediate position the valve must therefore inevitably be in unstable equilibrium, and it can only remain either fully closed or fully open.

Furthermore the valve should be capable of closing against the accumulated solids, and this requires more pressure than the weight of the valve can exert. If this valve does not close soon enough when some change in the operating conditions requires it to do so, the teetering bed is discharged and has to form again before normal operation is restored.

The object of the present invention is to provide valve mechanism for a classifier of this kind which will automatically adjust the degree of opening of the valve to a stable setting of such a valve that the discharge of solid particles through the valve just balances the accretion of such particles from the feed, however the rate of accumulation may vary.

According to the invention the arrangement comprises a chamber subjected to hydraulic pressure and operatively connected to the discharge valve and means for varying the pressure in the chamber as the hydrostatic pressure of the teetering solids varies. In the preferred form of the invention the hydraulic chamber is closed by a diaphragm connected to the valve, and the chamber has a fluid supply at substantially constant hydrostatic head and a discharge at a lower pressure, the chamber being connected to the supply and discharge by constricted channels, in one of which the constriction is varied in dependence on the hydrostatic pressure of the teetering solids. There is then a slight leakage through the hydraulic chamber, and the variation of the constriction produces a change in the pressure in the hydraulic chamber. The pressure in the hydraulic chamber may be balanced by a spring or by a constant hydraulic pressure.

The force initiating any adjustment is the differential pressure between a column of clear water and a column of water loaded with the teetering solids, and this pressure conveniently acts on a diaphragm balanced by a light spring. One constriction may then take the form of a small pilot valve, of which one member is attached to the latter diaphragm and the other to the diaphragm first mentioned. The valve mechanism then constitutes a kind of mechanical relay or follow-up mechanism which sets the discharge valve into a position corresponding to that of the diaphragm which in effect weighs the differential pressure. Other devices to produce a similar effect are also comprised within the scope of the invention and are described hereinafter.

The accompanying drawings serve to illustrate the application of the invention in practice and show several forms of construction. In the drawings

The description relates in every case to a single unit, but several such units may be combined to form a classifier acting in stages to separate out solids of different degrees of fineness; such a combination is not claimed as novel in itself.

Figure 1:
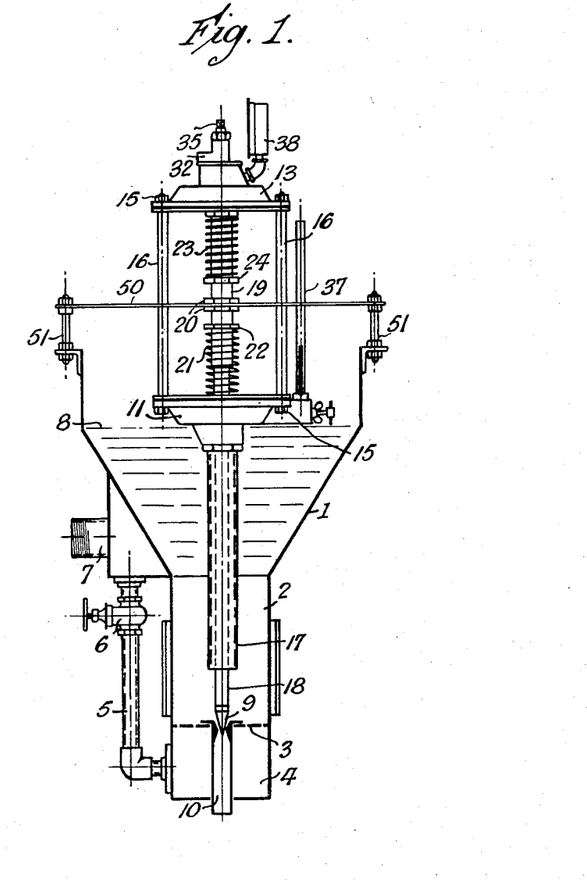
Figure 1 is an elevation partly in section of a simple form of classifier.

Referring to Figure 1, a separating chamber has a tapering upper part 1 and a parallel sided lower part 2 terminating in a perforated bottom plate 3 by which it communicates with a clean water chamber 4. The chamber 4 is connected by a pipe 5 and a valve 6 to a pipe spigot 7 receiving hydraulic water from a constant head tank (not shown). The material to be classified is fed in at the top of the chamber 1 and an overflow weir is provided for water carrying away fine material by which the water level is maintained at 8. A needle valve 9 is provided at the level of the perforated base permitting the discharge from the spigot 10 of the heavier or larger solids accumulating in the part 2 of the separating chamber. The apparatus so far described is a classifier of a known kind operating on the hindered settling principle. The valve 9 should be adjusted in a stable manner to discharge the solids exactly as fast as they accumulate, and this problem is solved by mechanism according to the invention which will now be described.

Figure 2:
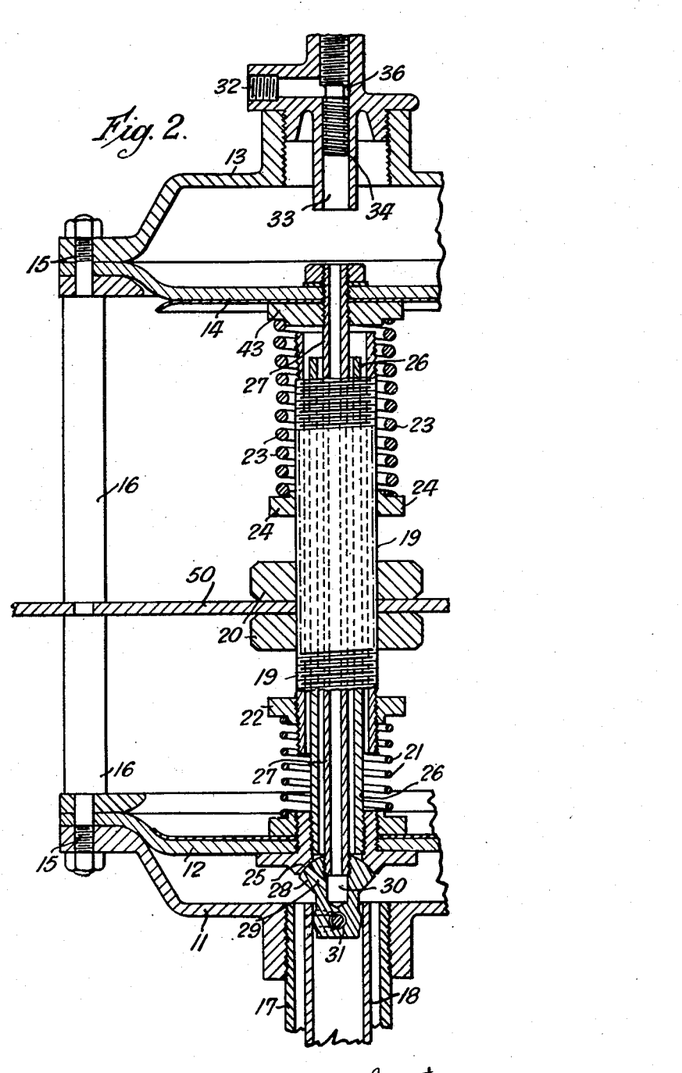
Figure 2 is a part sectional elevation of the valve operating mechanism of Figure 1.

A flat plate 50 bolted to the top of the separating chamber with distance pieces 51, serves to support the valve mechanism shown in elevation in Figure 1 and on a larger scale in section in Figure 2. A dish 11 with flexible diaphragm 12 is placed below the plate 50 and an inverted dish 13 with flexible diaphragm 14 above the same plate. These parts are fixed by bolts and nuts 15 with spacing tubes 16.

A tube 17 containing the valve stem 18 is fixed at the centre of the dish 11 and extends into the part 2 of the chamber, reaching below the upper surface of the teetering solids and having an open end there. The flat plate 50 also supports a vertical threaded tube 19 by means of a pair of back nuts 20 at its centre, and this tube constitutes the stationary basis on which the valve gear operates.

The lower diaphragm 12 is urged downwards by a light spring 21 supported from a nut 22 adjustable on the tube 19, and the upper diaphragm 14 is urged upwards by a strong spring 23 likewise supported from a nut 24 adjustable on the tube 19.

The lower diaphragm 12 has a spherical valve seating 25 facing downwards to constitute a closure for the diaphragm chamber. It also has a tube 26 extending upwards with clearance inside the tube 19 nearly to the upper diaphragm. The upper end of the tube 26 is open.

Inside the tube 26 and again with clearance is another tube 27, which is attached to the upper diaphragm 14 and terminates at its lower end in a spherical valve 28 to fit the seating 25. The tube 27 is closed at its lower end by the spherical valve 28, but a hole 29 is drilled in the latter from a part of its spherical surface located to make contact with the seating 25 to an internal space 30 communicating with the tube 27. The lower part of the valve 28 carries the valve spindle 18 by a flexible joint 31.

A water inlet 32 to the upper diaphragm chamber 13, 14 is connected by a flexible hose to a constant hydraulic head tank, which may be the same tank as referred to above or better a separate one with a higher head. Between the inlet 32 and the diaphragm chamber the water has to pass through a cylindrical passage 33 containing a closely fitting plug 34 of the same shape in which a long shallow helical groove is cut. Since all the water entering has to pass through the length of the helical groove, the quantity of water flowing in is restricted. The plug 34 is threaded at its upper part, so that it can be screwed up or down by a square head 35 to vary the length of the constricted channel. The water enters the channel by a deep circumferential groove 36 on the plug 34 between the threaded part and the grooved part. A water level gauge 37 shows the head of water in the lower diaphragm chamber, and a pressure gauge 38 shows the pressure in the upper diaphragm chamber.

When starting the classifier with no solids in the separating chamber the main needle valve 9 and the spherical control valve 28 will both be closed. They will remain closed until a sufficient quantity of solids has accumulated in the lower part 2 of the chamber above the bottom of the tube 17 to raise the hydraulic i. e., hydrostatic pressure in the lower diaphragm chamber 11, 12 to such an extent that the diaphragm rises against the pressure of the spring 21.

The spherical seat 25 of the control valve is thus lifted away from the valve 28 and some of the water in the upper diaphragm chamber 13, 14 leaks away into the lower chamber 11, 12. The pressure drops inside the upper diaphragm chamber because of the high resistance to the flow of water from the constant head tank through the helical groove in the plug 34. The spring 23 then pushes the diaphragm 14 up and accordingly raises the needle of the discharge valve 9.

At the same time the spherical member 28 of the control valve is brought closer to its seating 25 and the whole mechanism remains stationary in the new position. If the solids accumulate faster than they are discharged by the needle valve 9, the lower diaphragm 12 is raised further by the excess of pressure just as described above, until the needle of the valve 9 takes up a higher position permitting a greater discharge.

If on the other hand the valve 9 has opened too much, or if there is a change in the nature or amount of feed leading to a slower accumulation of solids, the pressure in the lower diaphragm chamber 11, 12 diminishes and the diaphragm 12 moves downwards. The spherical control valve 25, 28 is closed or partly closed, allowing the pressure to rise in the upper diaphragm chamber 13, 14. The increased pressure drives the diaphragm 14 downwards compressing the spring 23 until a new position of equilibrium is found. The result is to reduce the discharge by partly closing the needle valve 9.

This return movement is carried out very slowly because the upper diaphragm chamber is then almost or entirely closed except for the long helical groove in the plug 34. The opening movement is also fairly slow since the lower diaphragm 12 only rises slowly in response to the gradual change in the differential pressure as the solids accumulate. In normal operation the spherical valve 25, 28 is very slightly open and allows a slight leakage of water to pass from the upper diaphragm chamber 13, 14. Any change in the differential head between clean water and water plus solid thus immediately initiates a gradual but very certain adjustment of the moving parts, so that the level of teetering particles in the separating chamber 2 remains practically constant whatever may be the rate of accumulation.

The arrangement described above in its construction and operation may be regarded as a fundamental form. Various modifications have been introduced by way of improvement and will now be described briefly. The principle of operation is the same, and all that is necessary is to point out the differences.

Figure 3:
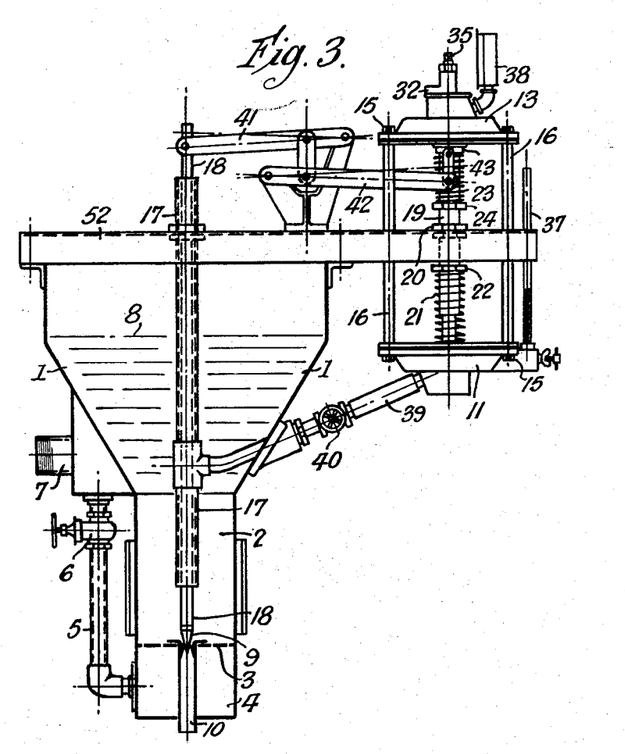
Figure 3 is a view similar to Figure 1 of a classifier with the valve mechanism mounted in a different position.

Figure 3 shows a form of construction in which the valve operating mechanism is removed to the side of the separating tank to protect it from any splashing of the feed. It is supported on a profile iron bracket 52 spanning and overhanging the tank. The lower diaphragm chamber is connected by a pipe 39 with a valve 40 to the tube 17, and the valve rod 18 is connected by levers 41 and 42 to the tapped plate 43 by which the diaphragm 14 is attached to the tube 27.

Figure 4:
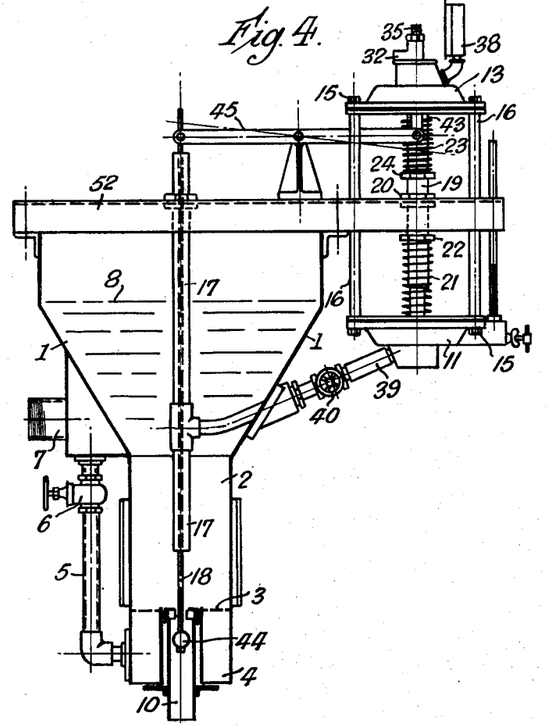
Figure 4 is a view similar to Figure 3 with a different type of discharge valve.

To obviate the use of a double lever arrangement 41 and 42 the arrangement shown in Figure 4 has a rubber ball valve 44 opening in the opposite direction to the needle valve 9 previously described. A plain two-armed lever 45 is then sufficient. The remainder of the apparatus is as shown in Figure 3.

Figure 5:
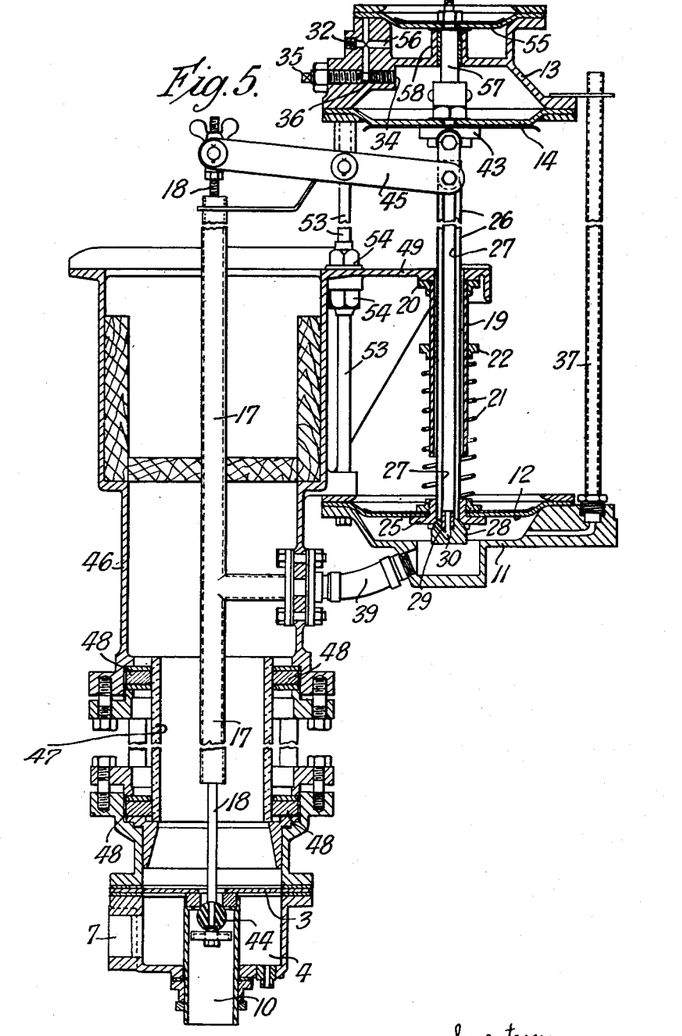
Figure 5 is a sectional elevation of a classifier in which constant hydraulic pressure is used instead of a spring to counterbalance the varying hydraulic pressure.

Figure 5 shows a modification departing a little further from the basic form of Figure 1. Here the separating chamber has vertical sides at its upper part 46, while the lower part 47 is in the form of a glass tube inserted with packing glands 48. Provision is made for inserting tubes of different diameters to suit the varying quantity or quality of the material to be dealt with. Of course a glass tube could be used in the forms previously described, or again a part of the wall could be of glass. Either arrangement permits observation of the process while in operation.

On account of the altered shape of the separating chamber the hydraulic water inlet 7 is placed directly on the clean water chamber 4. The valve gear is supported on a bracket 49 cast integral with the upper part 46 and is fixed by shouldered bolts 53 and nuts 54. The tube 19 extends downwards only and is fixed to the bracket 49 by a nut 20.

The spring 23 of the previous arrangements is replaced in its function by a third diaphragm 55 mounted on an upward extension of the dish 13. The effective area of the diaphragm 55 is about half that of the diaphragm 14, and the chamber below it is in unrestricted communication by a passage 56 with the water inlet 32.

A rod 57 connects the diaphragm 55 to the diaphragm 14 so that the two move together. The rod 57 passes through packing in a tubular extension 58 of the dish 13, the top constituting a stop to limit the downward movement of the rod and diaphragms.

Figure 6:
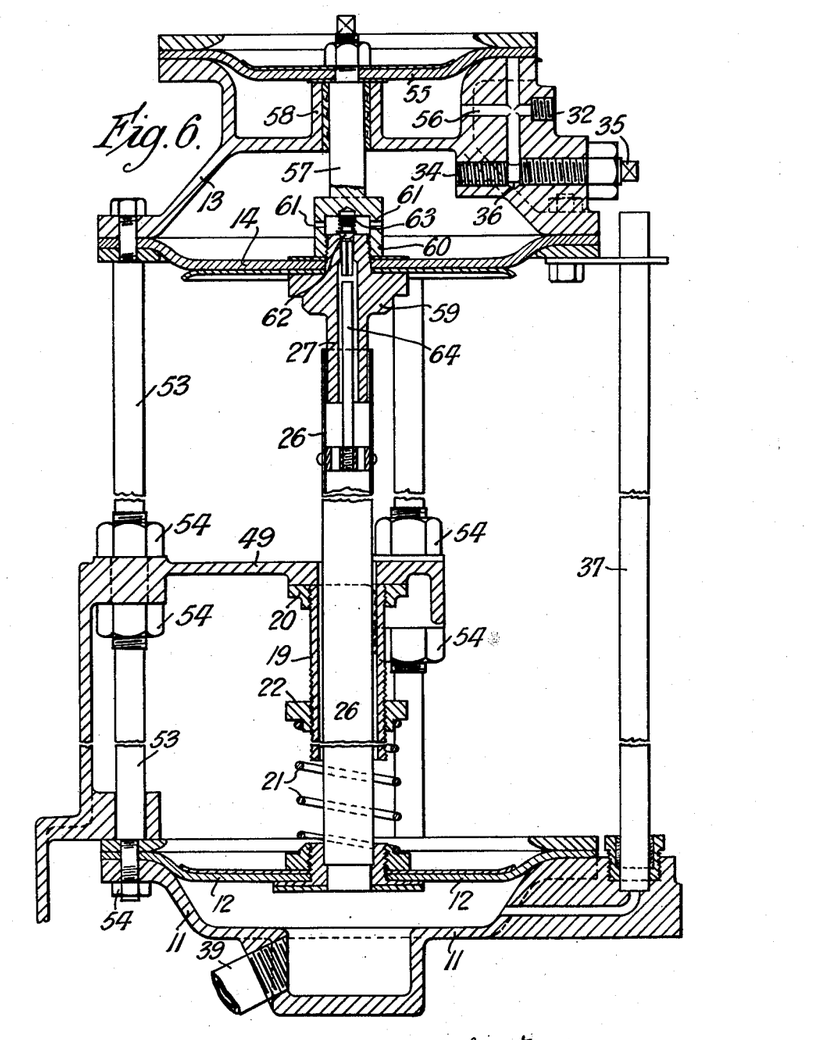
Figure 6 is a sectional elevation of modified valve gear for the arrangement of Figure 5 with a different form of pilot valve.

In Figure 6 the settling chamber and discharge valve with their details are similar to those shown in Figure 5 and are therefore not shown. The modification consists in the fitting of a different form of pilot valve to replace the spherical valve 28, and placing it in a different position.

The tube 26 is attached as before to the lower diaphragm 12 and extends nearly up to the upper diaphragm 14, but the tube 27 inside it only extends a short distance downwards on account of the position of the pilot valve.

The tube 27 is integral with a member 59 which carries out the functions of the previous tapped plate 43 in transmitting the movement of the diaphragm 14 to the discharge valve. The member 59 has a threaded extension projecting through the diaphragm 14 to engage a tapped extension 60 of the rod 57 and so grip the centre of the diaphragm.

The extension 60 has a cavity above the tapped part communicating by passages 61 with the diaphragm chamber 13, 14, and the bore of the tube 27 terminates in the same cavity. The upper end of this bore is made of reduced diameter and is blocked by a valve 62 with conical seating and grooved stem, the valve being normally held closed by a light spring 63. The pilot valve 62 may also be replaced by a little ball valve.

The tube 26 has attached to it a rod 64 projecting vertically upwards into the tube 27 to make contact with the stem of the valve 62 and lift it when the diaphragm 12 rises beyond a predetermined position in relation to the diaphragm 14. When this happens due to a rise in the level of the accumulated solids in the separating chamber, more water leaks away through the valve, the diaphragm 14 rises and increases the opening of the discharge valve, and when the new equilibrium position is established the valve 62 almost closes, allowing a steady slight leakage to pass down the tube 27. The lower end of this tube need only extend low enough to allow the leakage water discharged to pass into the tube 26 under all conditions, so that it does not wet the mechanism.

Figure 7:
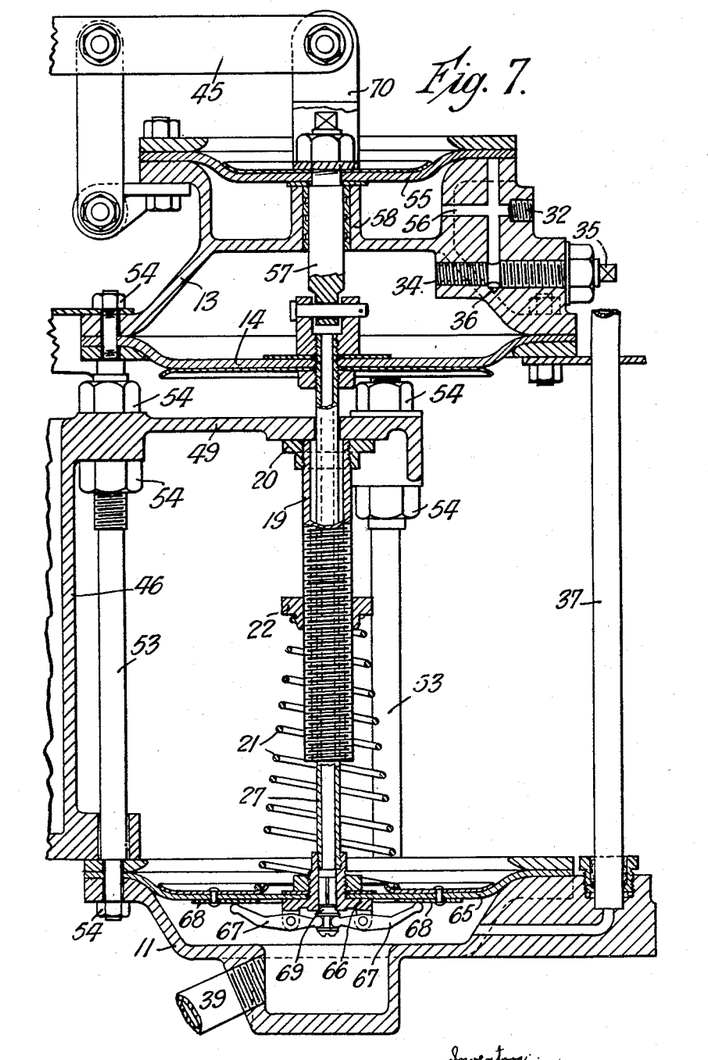
Figure 7 is a sectional elevation of valve gear for reduced height of assembly which represents the best form of valve operating gear so far devised.

The form of construction shown in Figure 7 can also be considered as developed from that of Figure 5, the pilot valve being similar in form to that of Figure 6 and in position to that of Figure 5. Only a part of the separating chamber is shown, the remainder being similar to that of Figure 5. The principal difference in the valve gear is the omission of the tube 26 in which the water stands at a level above the main overflow corresponding to the depth of the teetering solids. As a result the whole assembly can be reduced in height, as indicated in the figure by the level gauge 37, and there is room to fit the lever 45 at the top.

The tube 27 is connected as before to the upper diaphragm 14, and it is also connected to the centre of the lower diaphragm 65, which differs in construction from the diaphragm 12 of the previous figures. The stiffening plates on the diaphragm 65 are so arranged as to leave two annuli of flexure, the usual one near the peripheral clamp and an extra one around the central clamp 66, to which the tube 27 is attached. Bent levers 67 with rounded ends are pivoted on lugs on the clamp 66, and their outer ends make contact with the stiffening plate 68 of the diaphragm.

A valve 69 with grooved stem and conical seating is adapted to close a passage in the clamp 66 forming a continuation of the tube 27. The valve 69 has a grooved head to engage the inner ends of the levers 67. The spring 21 bears on the intermediate stiffened part of the diaphragm.

The top diaphragm 55 is attached as before to a rod 57, and at the upper side of the diaphragm a stirrup 70 is fixed to the rod 57 to actuate the discharge valve through the lever 45.

If it is assumed that the apparatus is in steady operation and that a change then occurs giving rise to a more rapid accumulation of the larger or heavier solids, an increased pressure is transmitted through the pipe 39 to the lower diaphragm chamber 11, 65. The increased pressure is too slight to move the centre part of the diaphragm appreciably, since it would at the same time have to move the diaphragm 14 by the same amount, but the annular intermediate part of the diaphragm 65 yields at once, slightly compressing the spring 21.

This relative movement of the diaphragm parts allows the hydraulic pressure in the tube 27 to open the valve 69 by a pivoting of the levers 67. The pressure diminishes in the diaphragm chamber 13, 14, and the diaphragm 14 rises, taking with it the centre part of the diaphragm 65. The valve 69 is closed a little since the annular intermediate part of the diaphragm 65 does not participate in the movement, and a new equilibrium position is found in which the main discharge valve is opened wider to discharge the accumulated solids faster. A reduced pressure on the diaphragm 65 due to slower accretion of solids in the separating chamber would produce movements opposite to those just described.

Figure 8:
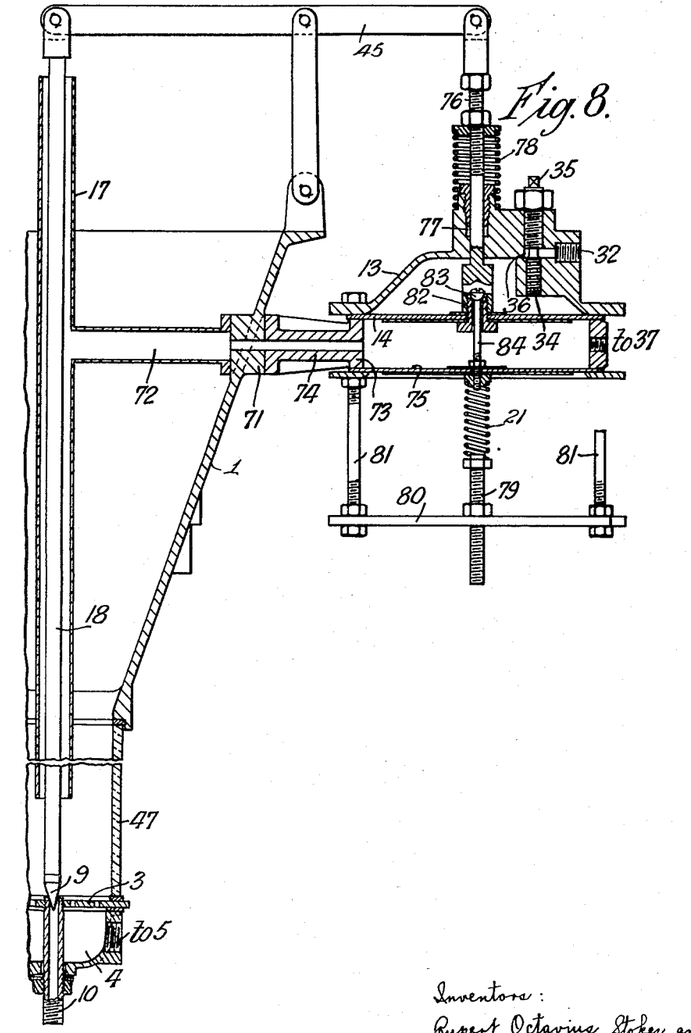
Figure 8 is a sectional elevation of a classifier with a different form of valve gear for compact construction.

Figure 8 shows an arrangement which may be regarded as a modification of Figure 3. The height of assembly of the valve mechanism is reduced by a different expedient from that of Figure 7, and a single lever is used for actuating a needle valve for the discharge.

The valve operating mechanism is attached to the upper part 1 of the main separating chamber by a boss 71 with a connecting pipe 72 teed off the tube 17. The chamber between the upper diaphragm 14 and its dish 13 is supplied with water from a steady head tank (not shown) through a restrictor 34 as before. The main support of the valve mechanism is an annular casting 73 bolted to the boss 71 by a lateral projection 74 with a central hole to establish communication between the pipe 72 and the space inside the casting 73.

This space is closed at the top by the diaphragm 14 and at the bottom by another diaphragm 75 taking the place of the previous diaphragm 12. A rod 76 is attached to the diaphragm 14 and passes through the dish 13 by a stuffing box 77, its upper end being attached to the lever 45. A strong spring 78 urges the rod 76 and the diaphragm 14 upwards, but, in contrast to the previous spring 23, it tends to close the valve 9.

The diaphragm 75 is urged upwards by a spring 21, the lower end of the spring 21 being supported adjustably by a bolt 79 screwed into a plate 80, which is attached to the casting 73 by studs 81 serving also to fix the diaphragm 75. A spherical valve seating 82 is formed in the lower end of the rod 76 communicating with the spaces on both sides of the diaphragm 14. A valve member 83 is adapted to bed on the seating 8 and is attached by a rod 84 to the diaphragm 75.

With the apparatus in use an increase of pressure in the tube 17 due to a greater rate of accumulation is transmitted through the tube 72 to the space between the diaphragms. The diaphragm 75 is pressed downwards against the spring 21 and reduces the aperture of the valve 83. The pressure then increases above the diaphragm 14 due to the reduced leakage, and the rod 76 is pulled downwards, opening the valve 9 a little more. The movement of the diaphragm 14 also restores the aperture of the valve 83 to its previous value, and the whole mechanism remains steady in its new position until some further change of pressure in the tube 17 causes a movement in the same or the opposite direction according to the direction of the change.

Figure 9:
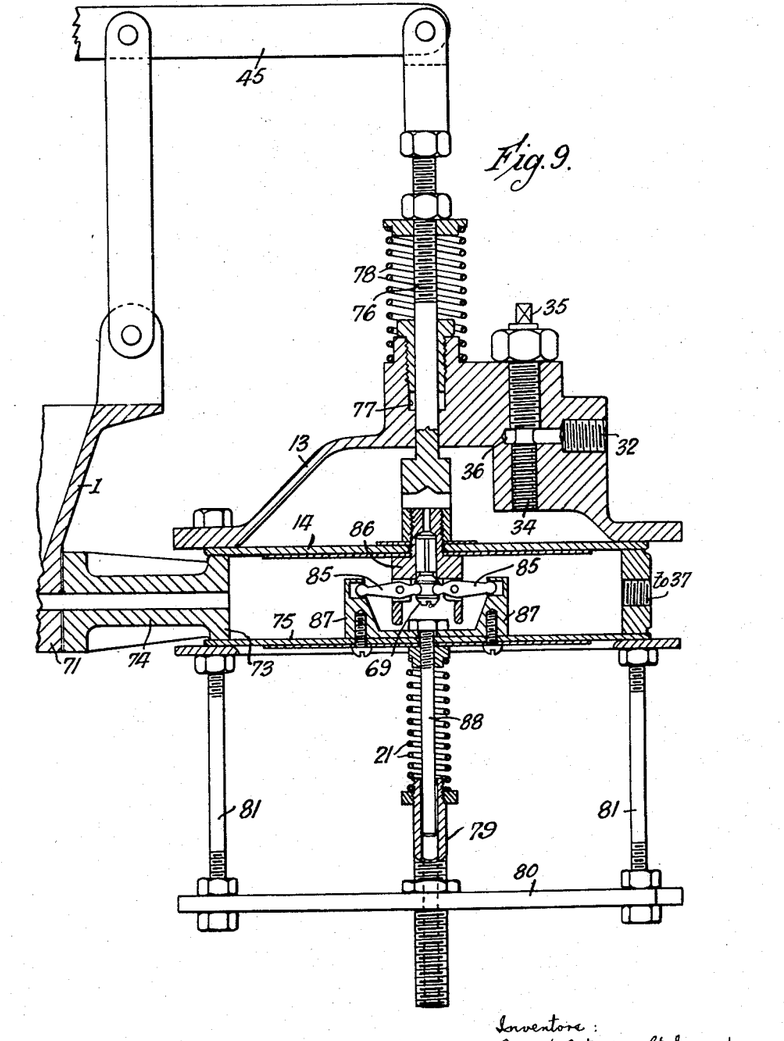
Figure 9 is a sectional elevation of valve gear similar to Figure 8 but with the pilot valve opening the opposite way.

The mechanism shown in Figure 9 is in most respects similar to that shown in Figure 8, but a modification is introduced into the operation of the pilot valve by borrowing an idea from Figure 7.

The pilot valve 69 is of the same form as described in connection with Figure 7 and is operated by levers 85 pivoted in the member 86 which serves to clamp the diaphragm 14 against the end of the rod 76. The outer ends of the levers 85 engage hollows facing inwards on the member 87 serving to clamp the lower diaphragm 75.

Any relative movement between the diaphragms 14 and 75 will thus pivot the levers 85 and vary the opening of the valve 69, the effect being the same as with the direct operation of Figure 8.

In the present case the bolt 79 is made hollow to receive a guide rod 88 having a screwed part near the head for attachment to the diaphragm fittings. The rod 88 also prevents the spring 21 from being inadvertently displaced.

What we claim is:

1. Mechanism for automatically adjusting the degree of opening of a valve for the continuous discharge of the larger or heavier solids accumulating in a teetering bed of a hydraulic classifier of the hindered settling type, comprising a diaphragm chamber with a diaphragm adapted to be subjected to the pressure due to the teetering bed, a second diaphragm chamber with a diaphragm, means providing a fluid supply to the second chamber at substantially constant hydraulic head, a discharge from the second chamber at a pressure lower than the supply, constricted channels connecting the second chamber to the supply and discharge respectively, a valve having two relatively movable members to constitute the restriction in one of the channels, operative connections between one valve member and the second diaphragm and between the other valve member and at least a portion of the first diaphragm, whereby the constriction in the discharge channel and with it the pressure in the second diaphragm chamber are adapted to be varied by a variation of hydrostatic pressure due to the teetering bed, and an operative connection from the diaphragm of the second chamber adapted to be coupled to the valve for the discharge of solids.

2. Mechanism for automatically adjusting the degree of opening of a valve for the continuous discharge of the larger or heavier solids accumulating in a teetering bed of a hydraulic classifier of the hindered settling type, comprising a hydraulic chamber, a diaphragm constituting a part of the chamber, a fluid supply to the chamber at substantially constant head, a discharge from the chamber at a pressure lower than the supply, constricted channels connecting the chamber to the supply and discharge respectively, means for varying the constriction in one of the channels in dependence on the static pressure of the teetering bed, a second hydraulic chamber, a diaphragm constituting a part of the chamber, this second diaphragm being of smaller area than the first and positively coupled thereto, a fluid supply to the second chamber without an interposed constriction, and an operative connection from the diaphragms adapted to be coupled to the valve.

3. Mechanism for automatically adjusting the degree of opening of a valve for the continuous discharge of the larger or heavier solids accumulating in a teetering bed of a hydraulic classifier of the hindered settling type, comprising a diaphragm chamber with a diaphragm adapted to be subjected to the pressure due to the teetering bed, a second diaphragm chamber with a diaphragm, one of said diaphragms and at least a portion of the other said diaphragm being movable independently relative to each other, means providing a fluid supply to the second chamber at substantially constant hydrostatic head, a discharge from the second chamber at a pressure lower than the supply, constricted channels connecting the second chamber to the supply and discharge respectively, a valve having two relatively movable members to constitute the restriction, operative connections between one valve member and the second diaphragm and between the other valve member and at least a portion of the first diaphragm, whereby the constriction in the discharge channel and with it the pressure in the second diaphragm chamber are adapted to be varied by a variation of hydrostatic pressure due to the teetering bed, and an operative connection from the diaphragm of the second chamber adapted to be coupled to the valve for the discharge of solids.

4. In operating mechanism for a valve for the continuous discharge of the larger or heavier solids accumulating in a teetering bed of a hydraulic classifier of the hindered settling type, a hydraulic chamber having a movable part thereof adapted to be coupled to the valve, a diaphragm chamber adapted to be subjected to the hydrostatic pressure due to the teetering solids, resilient means acting on the diaphragm in opposition to the said pressure, a pilot valve having one member connected to the diaphragm and the other to the movable part of the hydraulic chamber, a fluid supply under substantially constant head to the hydraulic chamber, a constriction in the inlet of the said supply, and a discharge connection for the same fluid from the hydraulic chamber through the pilot valve to the diaphragm chamber, the arrangement being such that a movement of the diaphragm alters the pressure in the hydraulic chamber by changing the pilot valve opening and the resultant movement of the moving part of the chamber brings the pilot valve back to a new steady condition.

5. Mechanism for automatically adjusting the degree of opening of a valve for the continuous discharge of the larger or heavier solids accumulating in a teetering bed of a hydraulic classifier of the hindered settling type, comprising a hydraulic chamber, a diaphragm constituting a part of the chamber, a fluid supply to the chamber at substantially constant head, a constriction between the fluid supply and the chamber, a spring acting on the diaphragm in opposition to the fluid pressure, a tube attached to the diaphragm and extending downwards, a valve at the lower end of the tube with spherical face directed upwards, the fluid pressure in the chamber being in communication through the tube with a hole in the valve face, a second hydraulic chamber below the first, a diaphragm constituting a part of the second chamber, a spring acting on the said diaphragm in opposition to the fluid pressure, a spherical valve seating attached to the second diaphragm to cooperate with the spherical valve, a tube attached to the spherical seating and extending upwards to surround with clearance the tube attached to the first diaphragm nearly up to the said diaphragm, a tube attached to the second hydraulic chamber and extending downwards into the teetering bed, and a valve spindle suspended on the spherical valve and passing down the last-named tube, the valve for the discharge of the solids being of the needle type and attached to the lower end of the spindle.

6. A control arrangement for providing a setting dependent on a varying hydraulic pressure comprising a hydraulic chamber subjected to the pressure, a diaphragm constituting a part of the chamber and having two annuli of flexure, a pilot valve operated by relative movement between the central and intermediate parts of the diaphragm, a connection between the central part of the diaphragm and the apparatus to be set, and a follow-up device to make the central part of the diaphragm follow the movements of the intermediate part.

7. A control arrangement for providing a setting dependent on a varying hydraulic pressure comprising a hydraulic chamber subjected to the pressure, a diaphragm constituting a part of the chamber and having two annuli of flexure, a pilot valve having a seating on the central part of the diaphragm, levers pivoted on the central part of the diaphragm and having their outer ends in contact with the intermediate part of the diaphragm, a grooved head on the valve to cooperate with the inner ends of the levers, a connection between the central part of the diaphragm and the apparatus to be set, and a follow-up device to make the central part of the diaphragm follow the movements of the intermediate part.

8. Mechanism for automatically adjusting the degree of opening of a valve for the continuous discharge of the larger or heavier solids accumulating in a teetering bed of a hydraulic classifier of the hindered settling type, comprising a hydraulic chamber, a diaphragm constituting a part of the chamber, a fluid supply to the chamber at substantially constant head, a constriction in the said supply, a second hydraulic chamber, a diaphragm constituting a part of the chamber and of smaller area than the first diaphragm, a connection from the supply to the second chamber without constriction, a mechanical connection between the diaphragms, the latter being set up to oppose each other, a third hydraulic chamber subjected to the static pressure due to the teetering solids, a diaphragm constituting a part of the chamber and having two annuli of flexure, a tube between the second diaphragm and the central part of the third diaphragm constituting a mechanical connection and a communication between the respective chambers, a valve seating at the end of the tube at the third diaphragm, a pilot valve to cooperate with the seating, levers pivoted on the central part of the diaphragm and having their outer ends in contact with the intermediate part of the diaphragm, a grooved head on the pilot valve to cooperate with the inner ends of the levers, a spring pressing on the intermediate part of the diaphragm in opposition to the pressure in the third chamber, and lever gear for connecting the diaphragms to the discharge valve.

9. Mechanism for automatically adjusting the degree of opening of a valve for the continuous discharge of the larger or heavier solids accumulating in a teetering bed of a hydraulic classifier of the hindering settling type, comprising a hydraulic chamber, a diaphragm constituting a part of the chamber, a fluid supply to the chamber at substantially constant head, a constriction between the fluid supply and the chamber, a second hydraulic chamber bounded in part by the diaphragm, a second diaphragm constituting another part of the second chamber, a pipe connection from the second chamber to a point in the teetering bed and a pilot valve movable by any relative movement between the diaphragms to vary the rate of fluid flow from the first chamber to the second, the first diaphragm being adapted to be operatively connected to the discharge valve.

10. Mechanism for automatically adjusting the degree of opening of a valve for the continuous discharge of the larger or heavier solids accumulating in a teetering bed of a hydraulic classifier of the hindered settling type, comprising a hydraulic chamber, a diaphragm constituting a part of the chamber, a fluid supply to the chamber at substantially constant head, a constriction between the fluid supply and the chamber, a second hydraulic chamber bounded in part by the diaphragm, a second diaphragm constituting another part of the second chamber, a pipe connection from the second chamber to a point in the teetering bed, a pilot valve controlling communication between the two chambers, levers pivoted on the first diaphragm and having their outer ends in engagement with the second diaphragm, a grooved head on the pilot valve to cooperate with the inner ends of the levers, a spring acting on the second diaphragm in opposition to the pressure in the second hydraulic chamber, lever gear for connecting the first diaphragm to the discharge valve, and a spring associated with the mechanical connections to act in opposition to the pressure in the first hydraulic chamber.

RUPERT OCTAVIUS STOKES.
WILLIAM DIXON JENKYN THOMAS.